United States Patent Office 3,312,887
Patented Apr. 4, 1967

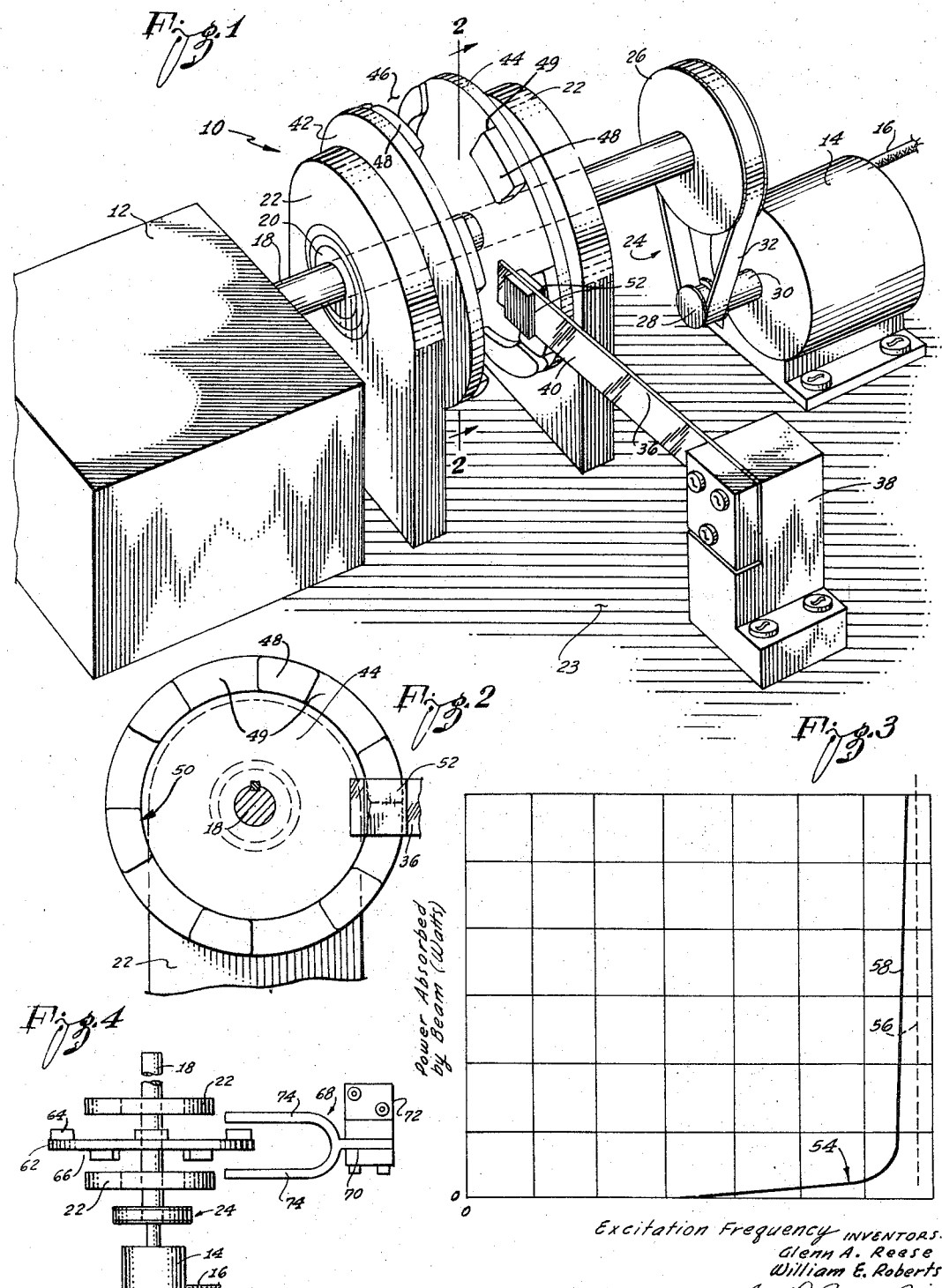

3,312,887
SPEED CONTROL FOR ELECTRIC MOTOR
Glenn A. Reese, San Pedro, and William E. Roberts, Culver City, Calif., assignors to The Magnavox Company, Torrance, Calif., a corporation of Delaware
Filed Feb. 26, 1963, Ser. No. 261,069
4 Claims. (Cl. 318—302)

The present invention relates to speed control means and more particularly to a new and improved means for limiting the speed of a rotating member to a predetermined amount.

It is frequently very desirable to be able to rotatably drive a member at a very precise speed with little or no variations therein. One means of accomplishing this is to provide a centrifugal governor or similar device that will sense the speed at which the member is rotating so as to provide a control signal. This control signal is then effective to regulate the driving motor to control the amount of power supplied to the driven member. Although this is an effective means for controlling the speed, it is not only very expensive and complicated, but also permits some variations in the speed of rotation and, as a consequence, the speed of the driven member will tend to "hunt" or "flutter."

A speed control means is now provided which will overcome the foregoing difficulties. More particularly, a speed control is provided which is not only simple and economical, but is also very effective to limit the speed at which a member is driven to a very precise amount without permitting any "hunting" or "flutter." This is accomplished by providing a resonant device which is coupled to the rotating member so as to absorb energy from the rotating member at a frequency that is a function of the speed of rotation. When the frequency equals the resonant frequency of the device, the amount of energy absorbed by the device will increase very rapidly. The amount of energy absorbed will exceed the amount of power available from the driving source and will thereby limit the speed of rotation.

In the form of the invention, a mechanically vibratable member such as a reed or tuning fork is disposed immediately adjacent to the rotating member so as to be magnetically coupled thereto. As the rotating member moves past the vibratile member or tuning fork, a mechanical vibration is created in the member or fork at a frequency which is a function of the speed of rotation. When the frequency of the vibrations approaches the resonant frequency of the member or fork, the amount of energy absorbed by the vibratile member will suddenly increase by a very large amount. This will be reflected as a counter-torque on the rotating member. Thus, the amount of power available to drive the rotating member is adequate to maintain the rotating member rotating at a speed which will maintain the vibratile member or tuning fork vibrating at a frequency below the resonant frequency of the tuning fork. The amount of power available to drive the rotating member is not sufficient at the resonant frequency of the tuning fork in view of the substantial amount of power absorbed by the tuning fork at this frequency. In this way, the speed of the rotating member cannot be increased to a speed corresponding to the resonant frequency of the tuning fork.

These and other features and advantages of the present invention will become readily apparent from the following detailed description of several embodiments thereof, particularly when taken in connection with the accompanying drawings wherein like reference numerals refer to like parts and wherein:

FIGURE 1 is a perspective view of a speed control means embodying one form of the present invention;

FIGURE 2 is a transverse cross-sectional view of the speed control means of FIGURE 1 and is taken substantially on the line 2—2 of FIGURE 1;

FIGURE 3 is a graph of the operating characteristics of the speed control means of FIGURE 1 at various speeds; and FIGURE 4 is a view of a speed control means embodying a modified form of the present invention.

Referring to the drawings in more detail, the present invention is particularly adapted to be embodied in a speed control means or governor 10 for regulating the speed at which a load 12 may be driven by a motor 14 whereby the speed at which the load 12 and the motor 14 may rotate will be maintained substantially constant under all operating conditions.

The drive motor 14 may be of any suitable variety that is capable of running at a generally constant speed for a generally constant load. For example, the motor 14 may be an electric motor that may be connected to a source of electric power by any suitable means such as an electric cable 16. The motor 14 is particularly adapted to continuously operate at a power level that is at least equal to or preferably somewhat greater than the power level required to maintain the load 12 running at the speed at which it is to be maintained during all operating conditions. As a consequence, the power source and the motor 14 will supply an excess amount of power to the system for driving the load 12. However, as will become apparent, the amount of excess power is preferably limited.

The load 12 which is to be driven by the motor 14 may be of any suitable variety that it is desired to maintain at a constant speed. For example, the load 12 may be a device such as a tape drive in a tape recorder. In such a drive, there is normally a capstan or the equivalent thereof that carries the tape through the recording and/or playback heads. In order to obtain faithful recordings and playback, it is essential that the capstan be driven at a constant fixed velocity at all times during all operating conditions and be free from any "hunting" or "flutter."

Heretofore, in order to obtain constant driving speeds, it has been customary to employ complete speed control means that regulate the power fed into the motor or to employ a synchronous motor. When the speed is controlled by regulating the power that is fed to the motor, it is inherent that some speed change occur before a correction occurs. Thus, a perfectly constant speed cannot be maintained. When a synchronous motor is employed, the speed of the motor can only be maintained as constant as the frequency of the power source. Although this frequency may be fairly constant when obtained from a large commercial power system, when the tape recorder is of a mobile or portable variety, an alternating source of power may not be available and/or the frequency thereof may not be sufficiently constant to insure a uniform speed for the motor.

The speed control means or governor 10 may be incorporated into the drive motor 14 or it may be incorporated into a load 12 such as a tape recorder. However, in the present instance, in order to more clearly illustrate the invention and to facilitate the description thereof, it is shown as being incorporated into a drive shaft 18 that operatively interconnects the drive motor 14 with the load 12. In the present instance, the shaft 18 is rotatably supported on a pair of bearings 20. The bearings 20 are, in turn, mounted in a pair of substantially parallel supports 22 that project upwardly from a member such as a chassis 23. The bearings 20 preferably are of a variety that insure the shaft 18 running true without any eccentric or erratic motion and create very little or no frictional drag on the rotation of the shaft 18.

The input end of the shaft 18 may be connected to the drive motor 14 by any suitable means. For example, a speed-reducing belt drive 24 may be provided.

In the present instance, this belt drive 24 includes a large diameter pulley 26 on the end of the shaft 18, a small diameter pulley 28 on the end of the shaft 30 of the motor 14, and a flexible belt 32 that extends between the two pulleys. This belt drive 24 should be capable of transmitting more torque than is required to drive the load and the speed control means.

The output end of the shaft 18 may be connected directly to the load 12 by any suitable means. It may be seen that this direct drive arrangement will cause the shaft 18 to rotate at a speed which is a constant and direct function of the speed of the motor 14. More particularly, the speed of the shaft 18 will be related to the speed of the motor 14 by a constant ratio equal to the gear ratio of the belt drive 24. At the same time, the speed at which the load 12 is driven will be a constant and direct function of the speed of the shaft 18.

The speed control means or governor 10 is operatively connected to the shaft 18 so as to be responsive to the speed of rotation of the shaft 18 and to control said speed. By controlling the speed of the shaft 18, the speed of the load 12 and the motor 14 will also be controlled. The present speed control means 10 includes at least one resonant means that forms an energy sink for absorbing energy. This means is coupled to the shaft 18 for obtaining energy therefrom at a frequency that is a function of the speed of rotation.

Although the resonant means may be of any desired variety, in the present instance it includes an elongated member 36 that is capable of mechanically vibrating. This member 36 may have a single or primary mode of resonance and be supported so as to be free to vibrate in that mode. More particularly, the member 36 has one end secured to an anchor or pillar 38 that projects upwardly from the chassis 23. The member 36 will thus form a cantilever beam with the outer end 40 thereof being free to vibrate in directions normal to the plane of the member 36. This member 36 is adapted to be driven so as to vibrate at any of the frequenices throughout a wide range of frequencies. As previously stated, the member 36 has a primary resonant frequency. When driven or excited at this frequency, the free end 40 of the member 36 will be deflected or displaced through a very wide range. When vibrating with such a large amplitude, the member 36 will absorb large quantities of energy. At all other frequencies in the frequency range the amplitude of the vibrations will be relatively small. As a consequence, the amount of energy required to sustain the lower level vibrations in the member 36 will be relatively negligible. As will become apparent subsequently, it is desirable for the "Q" of the member 36 to be very high. That is, the member will vibrate in the resonant mode only within a very narrow band of frequencies and the transition between the resonant and non-resonant modes will be very abrupt and the difference between the amplitudes of the resonant and non-resonant vibrations is very large.

The vibratile or resonant member 36 may be coupled to the shaft 18 by any means that will cause the member 36 to vibrate at a frequency that is a function of the speed of rotation of the shaft 18 and will cause the energy for sustaining the vibrations to be absorbed from the shaft 18. Although this may be accomplished by any suitable means in the present instance the coupling is accomplished magnetically. More particularly, a pair of discs 42 and 44 are secured to the shaft 18. These discs 42 and 44 are locked on the shaft 18 and will rotate with the shaft 18 at the same speed as the shaft 18. The discs 42 and 44 are disposed substantially parallel to each other but are separated by a space 46 of substantially uniform thickness.

The two discs 42 and 44 are positioned such that the vibrating member 36 will extend into the space 46 between the two discs 42 and 44 so as to be at least partially surrounded by the discs 42 and 44.

The discs 42 and 44 may be equipped with means for exciting the member 36 into vibrating as the discs 42 and 44 rotate therepast. In the present instance, this is accomplished by means of a plurality of magnets 48 that are secured to the discs 42 and 44. Each of the discs 42 and 44 may have the magnets 48 secured thereto at substantially uniformly spaced intervals 49 and at a constant radius for the axis of rotation. The magnets 48 will thus extend circumferentially around the discs and form rings 50. These rings 50 are spaced so as to register with a member 52 of the member 36 that is surrounded by the discs 42 and 44. These magnets 50 will thus react with the member 36 and deflect it from its neutral or center position. A member 52 may consist of a magnetic material that will react with the magnetic fields to increase the strength of the reaction.

The magnets 48 in each ring 50 may be spaced from each other by an arc that is substantially equal to the length of the magnets 48 to provide open spaces therebetween. In addition, the magnets 48 in each of the two rings 50 may be displaced circumferentially from each other. Thus, a magnet 48 on one disc will be aligned with an empty space on the other disc. As a consequence, as the shaft 18 rotates and carries the discs 42 and 44 therewith, a magnet 48 on the first disc becomes juxtaposed to the member 36 and draws it toward the magnet. As the discs continue to rotate, a magnet 48 on the second disc will come into registry with the member 36 and attract toward the second disc. As the discs 42 and 44 continue to rotate, the member 36 will be alternatively attracted toward the two discs. As a consequence, the member 36 is forced to vibrate back and forth at the same rate that the magnets 48 are moving therepast. As a consequence, the member 36 vibrates at a frequency that is a multiple of the speed of the shaft 18, the multiple being determined by the number of magnets 48. This, in turn, means that the member is being forced to vibrate at frequencies that are related by a constant to the speed at which the motor and the load are running. If desired, magnets 49 may be disposed between the magnets 48. The member 52 may then be permanently magnetized so as to react with the magnets 48 and 49. This will permit the member 36 to be both pushed and pulled and will thereby increase the amount of coupling between the discs and the member 36.

In order to employ this speed control means 10, the shaft 18 is connected to the motor 14 by the belt drive 24 and to the load 12 so as to transfer rotary energy directly from the motor 14 to the load 12. The vibratile member 36 is disposed between the discs 42 and 44 so as to be attracted by magnets 48. The motor 14 is then connected to a suitable power source and energized. The motor 14 will then begin to run. As the motor 14 runs, it causes the belt 32 to rotate the shaft 18 whereby the load 12 and the discs 42 and 44 also rotate. As the discs rotate, the magnets 48 cause the member 36 to vibrate.

As previously stated, the power source and the motor 14 are capable of supplying an excess of power over that required to drive the load 12 at the required speed. Therefore, the motor 14, the shaft 18 and the load 12 all accelerate toward the desired speed. During this process, the magnets 48 on the two discs 42 and 44 are passing the member 36 and causing it to vibrate. The frequency of these vibrations also increase at the same rate that the speed of rotation is increasing. These vibrations are effective to cause energy to be absorbed from the shaft 18 and be dissipated in the member 36. As a consequence, they create a torque on the shaft 18 and add to the load 12.

FIGURE 3 is a graph showing the amount of power that may be dissipated in a typical vibrating member at varying frequencies. As will be seen from the curve 54 in this graph, at the lower frequencies very little, if any, power is absorbed out of the shaft 18 by the member 36. During this range of operation, substantially all of the power from the motor 14 is available to accelerate and drive the load 12. However, as the speed of rotation increases, the frequency of the vibrations increases and the amount of power being absorbed becomes increased. The amount of this increase remains negligible until the speed approaches the resonant frequency of the member 36, i.e., the frequency of the line 56. During this portion 58, the amount of power absorbed begins to increase progressively. As the difference between the exciting frequency and the resonant frequency decreases to a very small amount, the absorption of the power increases very rapidly.

As stated before, the power derived from the shaft 18 is used to drive the load. Although the motor 14 has an excess of power over that required for driving the load 12 at the desired speed, this excess is less than the amount of power that can be absorbed by the member 36. Therefore, the motor 14 is able to cause the member 36 to be vibrated at a speed somewhat less than resonant frequency. However, it does not have enough power to drive the load 12 and the member 36 beyond the resonant condition. It may be seen that the motor 14 causes the load 12 and the member 36 to operate on the portion 58 of the curve 54 just below resonance. Since this portion 58 has a very steep slope, very small changes in the exciting frequency cause extremely large changes in the amount of power absorbed. Thus, the normal fluctuations in the power requirements that may occur in the load 12 cause insignificant changes in the speed.

As an alternative, the embodiment 60 of FIGURE 4 may be employed. This embodiment 60 may be very similar to the first embodiment in that it can be mounted on the shaft 18 for absorbing a surplus of power therefrom so as to limit its speed. In this embodiment 60, a single disc 62 is mounted on the shaft 18 to rotate therewith at the same speed. A plurality of magnets 64 are secured to the disc 62 at substantially uniformly spaced increments. The magnets 64 disposed are at a common radius from the axis of rotation so that they will form a ring. The magnets 64 may be separated from each other by spaces 66 of approximately the same size as the magnets 64.

A resonant structure such as a tuning fork 68 preferably has the base 70 thereof mounted on a rigid support 72 so that the tines of the fork will project along the opposite sides of the disc 62. At least portions of the tines 74 will be adjacent to the areas swept out by the magnets 64. Thus, the magnets 64 will react with the tines 74 to alternately attract the tines inwardly and to release them.

When this embodiment is employed, the disc 62 rotates in the area between the tines so as to carry the magnets therebetween. The magnets 64 then excite the tuning fork 68 into vibrating and absorbing energy from the shaft. The manner in which this energy is absorbed is similar to that shown in FIGURE 3. As a consequence, the speed of rotation is limited in much the same manner as in the first embodiment.

While only a limited number of embodiments of the present invention are disclosed and described herein, it will be readily apparent to persons skilled in the art that numerous changes and modifications may be made thereto without departing from the spirit of the invention. For example, the resonant means may be a vibratile member such as the single member shown or a plurality of members. Also, the resonant means may be mounted in a fixed position as shown and excited by means rotating with the shaft or the parts may be inverted with the resonant means mounted on the shaft to rotate therewith. Also, they may be incorporated into the motor or onto the load so as o form an integral part thereof. Also, the means for coupling the energy into the resonant means may be magnetic as shown or the equivalent thereof. Accordingly, the foregoing disclosure including the drawings and the description thereof are for illustrative purposes only and do not limit the scope of the invention which is defined only by the claims that follow.

What is claimed is:

1. A speed-limiting governor for limiting the speed of rotation of a drive motor and the load that is to be driven thereby to a predetermined constant speed, said governor comprising the combination of:

a drive motor for being operatively interconnected with said load for rotatably driving said load at a speed that is a direct function of the speed at which said motor is running, a shaft connected to said motor to be driven thereby at a speed that is a direct function of the speed of said motor, a pair of discs mounted on said shaft to rotate therewith, said discs being separated by a substantially uniform space, a resonant member for having mechanical vibrations induced therein, said member requiring a minimum amount of power to sustain said vibrations at frequencies differing from the resonant frequency of said member and requiring a maximum amount of power to sustain said vibrations at frequencies that are equal to said resonant frequencies, means for supporting said member with a free end disposed in said space between said discs, and magnetic means disposed on said discs so as to react with said free end of said member as said discs rotate, said magnetic means being effective to periodically attract said resonant member to induce vibrations in said resonant member, the frequency of said vibrations being a function of the speed of rotation of said motor and said load, said resonant member having a natural resonant frequency equal to the frequency of the vibrations induced in said member when said motor and said load are rotating at said speed.

2. A speed-limiting governor for limiting the speed of rotation of a drive motor and a load driven thereby at a particular speed, including:

a drive motor operatively interconnected with said load for rotatably driving said load at a speed that is a direct function of the speed of said motor, a shaft connected to said motor to be driven thereby at a speed that is a direct function of the speed of said motor, a pair of discs mounted upon said shaft for rotating with said shaft, said discs being separated from each other by a substantially uniform space, a series of magnets circumferentially spaced around said discs for rotating with said discs, a resonant member disposed between said discs in magnetically coupled relationship to the magnets and having a resonant frequency at the particular speed and for absorbing decreased amounts of energy at motor speeds different from the particular speed, and means for supporting said resonant member at one end thereof so as to position the free end of said member in the space between said discs for the production of vibrations in said resonant member at a frequency that is a function of the speed of rotation of said motor.

3. A speed-limiting governor for limiting the speed of rotation of a drive motor and the load that is to be driven thereby to a predetermined constant speed, said governor comprising the combination of:

a drive motor for being operatively interconnected with said load for rotatably driving said load at a speed that is a direct function of the speed of said motor and is at least equal to said constant speed, said motor having an excess of power for driving said load at said speed, means for interconnecting said motor with a source of power for supplying an excess of power to said motor to insure said motor driving said load at at least said speed, a shaft operatively interconnected with said motor so as to be driven at a speed that is a function of the speed at which said motor is running said load, a pair of members mounted upon said shaft for rotating therewith at the same speed and being separated from each other by a space of substantially uniform thickness, a series of magnets mounted on said member at substantially uniformly spaced increments to rotate with said member, a resonant member having a resonant frequency related to the particular speed for absorbing considerable amounts of magnetic energy at the particular speed and for absorbing decreased amounts of energy at motor speeds differing from the particular speed, mounting means supporting said resonant member by one end so as to position the free end thereof in said space and between said discs, said magnets being positioned to attract the free end of said member as said discs rotate therepast for inducing mechanical vibrations in said resonant member at a frequency that is a function of the speed of rotation of said member, said resonant member requiring a minimum amount of power to sustain said vibrations when this frequency differs from the resonant frequency of said resonant member and requiring a maximum amount of power to sustain said vibrations when the frequency thereof is equal to said resonant frequency, said maximum amount of power being at least equal to said excess power, said magnets being positioned upon said discs so as to vibrate said resonant member at its resonant frequency when said motor and load are rotating at said speed.

4. A speed-limiting governor, including:

a drive motor operatively interconnected with said load for rotatably driving said load at a speed dependent upon the speed of said motor, said motor having a limited excess of power for driving said load, a source of power, means interconnecting said drive motor with said source of power for supplying said limited excess of power to said motor for driving said load, a rotary member operatively coupled to said drive motor for rotation with said motor, a tuning fork having at least one tine for receiving mechanical vibrations, the tuning fork being sharply resonant at a particular frequency, means mounting said tuning fork with said tine in contiguous relationship to said disc, magnetic means disposed on the end of the tine in contiguous relationship to the disc, and a series of magnets disposed on said disc for attracting said magnetic means on said tine for creating vibrations in said tine at a frequency dependent upon the speed of rotation of said motor and the number of magnets in the series, said tine requiring a relatively small amount of power to sustain said vibrations at frequencies differing from the resonant frequency of said tuning fork and a relatively great amount of power to sustain said vibrations at said resonant frequency, said relatively great amount of power being greater than said limited excess of power, said magnets being disposed in uniformly spaced relationship to one another on said rotary member in the direction of rotation of the rotary member to obtain vibrations of said tine at a frequency dependent upon the speed of the motor and the number of magnets in the series.

References Cited by the Examiner
UNITED STATES PATENTS 1,907,531   5/1933   Fitzgerald et al.   318—47 X
2,898,537   8/1959   Cluwen   318—47 X ORIS L. RADER, *Primary Examiner.*

J. C. BERENZWEIG, *Assistant Examiner.*